United States Patent
Jang (10) Patent No.: US 9,124,904 B2
(45) Date of Patent: Sep. 1, 2015

(54) APPARATUS AND METHOD OF MODIFYING USER INTERFACE BASED ON NETWORK CONDITION

(71) Applicant: Bong Jin Jang, Seoul (KR)

(72) Inventor: Bong Jin Jang, Seoul (KR)

(*) Notice: Subject to any disclaimer, the term of this patent is extended or adjusted under 35 U.S.C. 154(b) by 0 days.

(21) Appl. No.: 13/670,474

(22) Filed: Nov. 7, 2012

(65) Prior Publication Data

US 2013/0117685 A1  May 9, 2013

(30) Foreign Application Priority Data

Nov. 7, 2011  (KR) ........................ 10-2011-0115256

(51) Int. Cl.
| | |
|---|---|
| *H04N 21/231* | (2011.01) |
| *H04N 21/414* | (2011.01) |
| *H04N 21/432* | (2011.01) |
| *H04N 21/433* | (2011.01) |
| *H04N 21/462* | (2011.01) |
| *H04N 21/482* | (2011.01) |
| *H04N 21/61* | (2011.01) |

(52) U.S. Cl.
CPC ....... *H04N 21/231* (2013.01); *H04N 21/41407* (2013.01); *H04N 21/4325* (2013.01); *H04N 21/4334* (2013.01); *H04N 21/4622* (2013.01); *H04N 21/482* (2013.01); *H04N 21/6131* (2013.01)

(58) Field of Classification Search
None
See application file for complete search history.

(56) References Cited

U.S. PATENT DOCUMENTS

| | | | |
|---|---|---|---|
| 6,496,980 B1* | 12/2002 | Tillman et al. | 725/90 |
| 8,321,401 B2* | 11/2012 | Edwards et al. | 707/709 |
| 8,700,739 B2* | 4/2014 | Khedouri et al. | 709/219 |
| 2003/0018767 A1* | 1/2003 | Chatani et al. | 709/223 |
| 2006/0265329 A1* | 11/2006 | Hug | 705/50 |
| 2008/0046827 A1* | 2/2008 | Sibley et al. | 715/751 |
| 2008/0177860 A1* | 7/2008 | Khedouri et al. | 709/217 |
| 2010/0082821 A1* | 4/2010 | Rosenblatt et al. | 709/228 |
| 2010/0205528 A1* | 8/2010 | Bavor et al. | 715/259 |
| 2011/0060998 A1* | 3/2011 | Schwartz et al. | 715/738 |
| 2011/0286437 A1* | 11/2011 | Austin et al. | 370/338 |
| 2013/0045680 A1* | 2/2013 | Dua | 455/41.1 |
| 2013/0045681 A1* | 2/2013 | Dua | 455/41.1 |
| 2013/0047084 A1* | 2/2013 | Sanders et al. | 715/716 |
| 2013/0080516 A1* | 3/2013 | Bologh | 709/203 |
| 2013/0132854 A1* | 5/2013 | Raleigh et al. | 713/738 |
| 2014/0123005 A1* | 5/2014 | Forstall et al. | 715/716 |

FOREIGN PATENT DOCUMENTS

| | | |
|---|---|---|
| KR | 10-2006-0123317 A | 12/2006 |
| KR | 10-0862359 B1 | 10/2008 |
| KR | 10-2010-0032739 A | 3/2010 |

* cited by examiner

Primary Examiner — Matt Kim
Assistant Examiner — Maryam Ipakchi
(74) Attorney, Agent, or Firm — Patent Office of Dr. Chung Park (57) ABSTRACT

Provided is an apparatus and method of modifying a user interface based on a network condition. The apparatus includes a communication unit, a contents replaying unit, a determination unit, and an interface modification unit. The communication unit communicates with a server through one or more wired/wireless communication methods. The contents replaying unit provides a user interface screen for selecting contents and replaying contents selected by the user. The determination unit determines whether or not network connect with the server is necessary for the replaying of the contents displayed on the user interface screen for selecting the contents. The interface modification unit modifies the user interface screen for selecting the contents according to whether or not the network connection is necessary.

12 Claims, 5 Drawing Sheets

APPARATUS AND METHOD OF MODIFYING USER INTERFACE BASED ON NETWORK CONDITION

CROSS-REFERENCE TO RELATED APPLICATIONS

This U.S. non-provisional patent application claims priority under 35 U.S.C. §119 of Korean Patent Application No. 10-2011-0115256, filed on Nov. 7, 2011, the entire contents of which are hereby incorporated by reference.

BACKGROUND OF THE INVENTION

The present invention disclosed herein relates to an apparatus and method of modifying a user interface based on network conditions, and more particularly, to a configuration of a user interface in a unit that receives and replays contents from a server through a network.

The digital contents which used to be distributed in the form of package are now distributed online thanks to the expansion of the internet infrastructure. As the technologies related to computer hardware and network communication became more sophisticated, it became normal to play the high-resolution video by receiving the contents in a streaming method in real-time.

Particularly, now we have an environment in which we rely less on the personal computers connected by cables, but more on the smart phones and the tablets connected wirelessly to have an easier access to the vast amount of contents in the server without the limitation of time and place.

Meanwhile, how a user uses the contents he/she received from the server and the types of network connection to the server can be classified into some categories.

Firstly, a user may wish to access the contents while the network connection to the server is disconnected, and in such case, a user may download the contents from the server and save the contents in a local storage to access regardless of the network availability.

A user may not have enough storage space in the local terminal or require infrequent use of the contents, and in such case, a user accesses the server through a network and plays contents by receiving the contents in real-time through a streaming method.

The type of connection to the server through a network also can be classified into a few categories. A terminal can directly be connected to a wired network that is established in a home or office, or can be connected wirelessly to the network via an Access Point (AP) using a WiFi adaptor. When such type of connection is used, a user can perform a stable connection within a bandwidth allowed to the service products that the user subscribed. However, the wired LAN has a limited mobility, and the wireless LAN also has a significant limitation in the area of mobility because the stable connection is guaranteed only within a certain distance from the AP.

Recently, instead of such traditional types, mobile communication networks referred as 3G or 4G, or other wireless communication methods such as Wibro are being used.

When using such mobile communication methods, a user can overcome the spatial limitation, owing to the existing nationwide infrastructure. In order words, a user can access a network regardless of places such as a school, a street, and an office or even while the user is moving in an automobile.

However, due to the characteristics of communication methods that use a certain radio frequency, the quality of connection can vary according to the distance from a base station, the signal strength emitted from the base station, and the presence or absence of obstacles. Also, the communication methods using a radio frequency have a limited bandwidth compared to those using a wired/wireless LAN.

Thus, when users play contents received from the server through a network, users select whether to utilize 3G or WiFi to connect to the server according to the availability of an equipped network adaptor, and select a resolution in consideration of an available bandwidth when receiving a video by the streaming method.

Sometimes, users try to download contents when a frequent use of contents is expected. However, when the downloading is interrupted due to disconnection from a server during the downloading based on the conditions of network, a user tries to download the contents waiting for the network to be connected again.

In other words, a user selects or changes the connection method in active response to various circumstances to ensure a smooth use of the contents.

Seen from a different angle, this means that a user needs to be fully aware of the functions and how-to-use of his/her equipment, information regarding a required bandwidth for his/her desired activity, conditions of network, and type of desired contents.

Many factors such as various network connection methods, changes in network condition, type of contents and difference between required bandwidths cause the reduction of usability, causing inconvenience to most of the users who has a low level of understanding in the technical aspect and the how-to-use of the equipment.

Accordingly, it is necessary to study and develop a user interface and a processing method by which a user can access contents through a network regardless of the various factors such as network conditions or contents types.

SUMMARY OF THE INVENTION

The present invention provides a method of modifying a user interface, which allows a user to conveniently receive and use contents through a network without paying attention to various factors such as network connection state of a user.

Embodiments of the present invention provide apparatuses of modifying a user interface based on a network condition, including: a communication unit communicating with a server through one or more wired/wireless communication methods; a contents replaying unit providing a user interface screen for selecting contents and replaying contents selected by the user; a determination unit determining whether or not network connect with the server is necessary for the replaying of the contents displayed on the user interface screen for selecting the contents; an interface modification unit modifying the user interface screen for selecting the contents according to whether or not the network connection is necessary.

In other embodiments of the present invention, methods of modifying a user interface based on a network condition, which are executed in an apparatus of connecting to a server through a network to receive contents and display the contents on a screen, the method including: determining whether or not the network connection with the server is necessary for replay of the contents with respect to the contents displayed on the user interface screen and modifying the user interface screen for selecting contents according to whether or not the network connection is necessary when displaying the user interface screen for selecting contents; immediately replaying contents when one of the contents displayed on the user interface screen is selected by a user and the selected contents are replayable without the network connection with the server and connecting to the server through a network to receive the selected contents when the network connection with the server is necessary.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hereinafter, exemplary embodiments of a user interface modification apparatus based on network conditions will be described in detail with reference to the accompanying drawings. In order to clarify the present invention, a description irrelevant to the constitution of the present invention will be omitted, and in the drawings, like reference numerals refer to like elements throughout.

Since the terms "including", "comprising", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

In the detailed description of the invention and claims, components named as "~unit", "~part", "~module", and "~block" mean units that process at least one function or operation, and each of which can be implemented by software, hardware, or a combination thereof.

Figure 1:
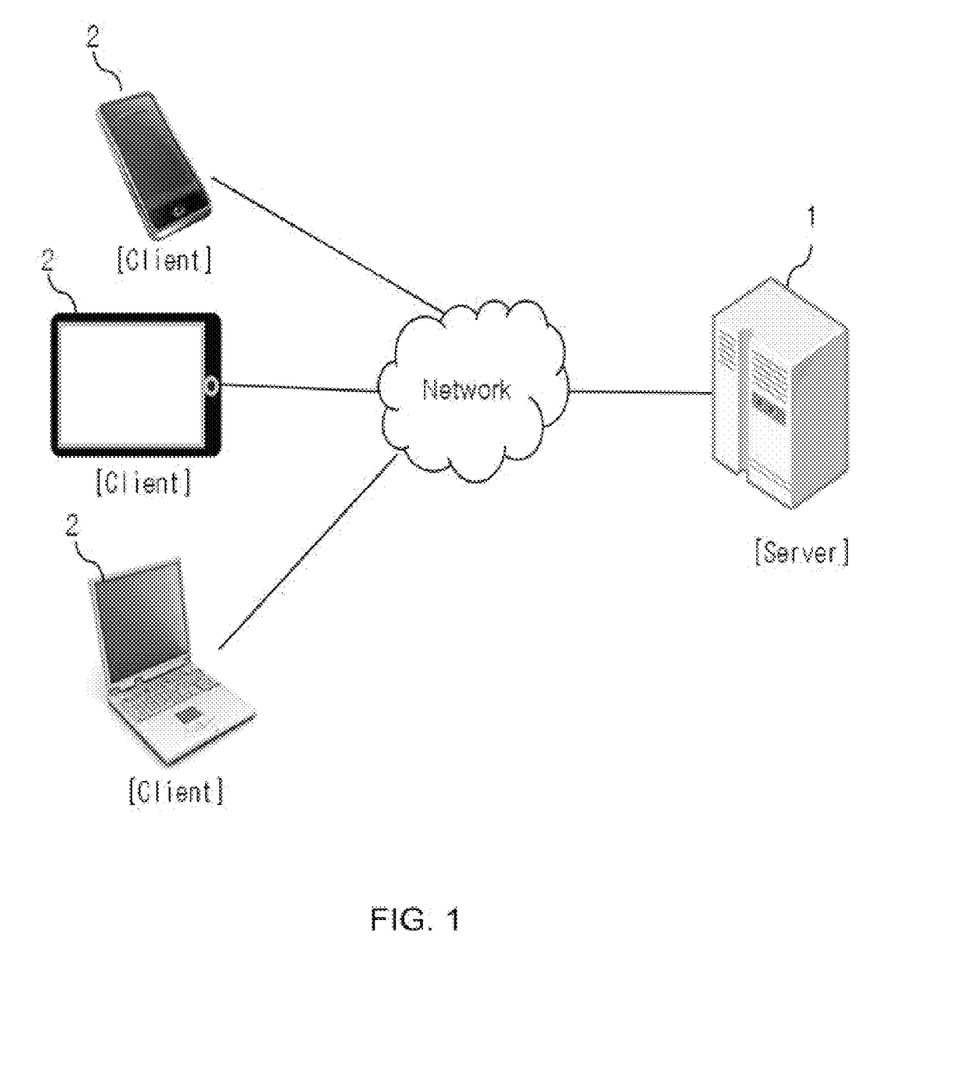
FIG. 1 is a view of a network illustrating a connection relation between a server providing contents and a client receiving contents from the server and replaying the contents according to an embodiment of the present invention.
Figure 2:
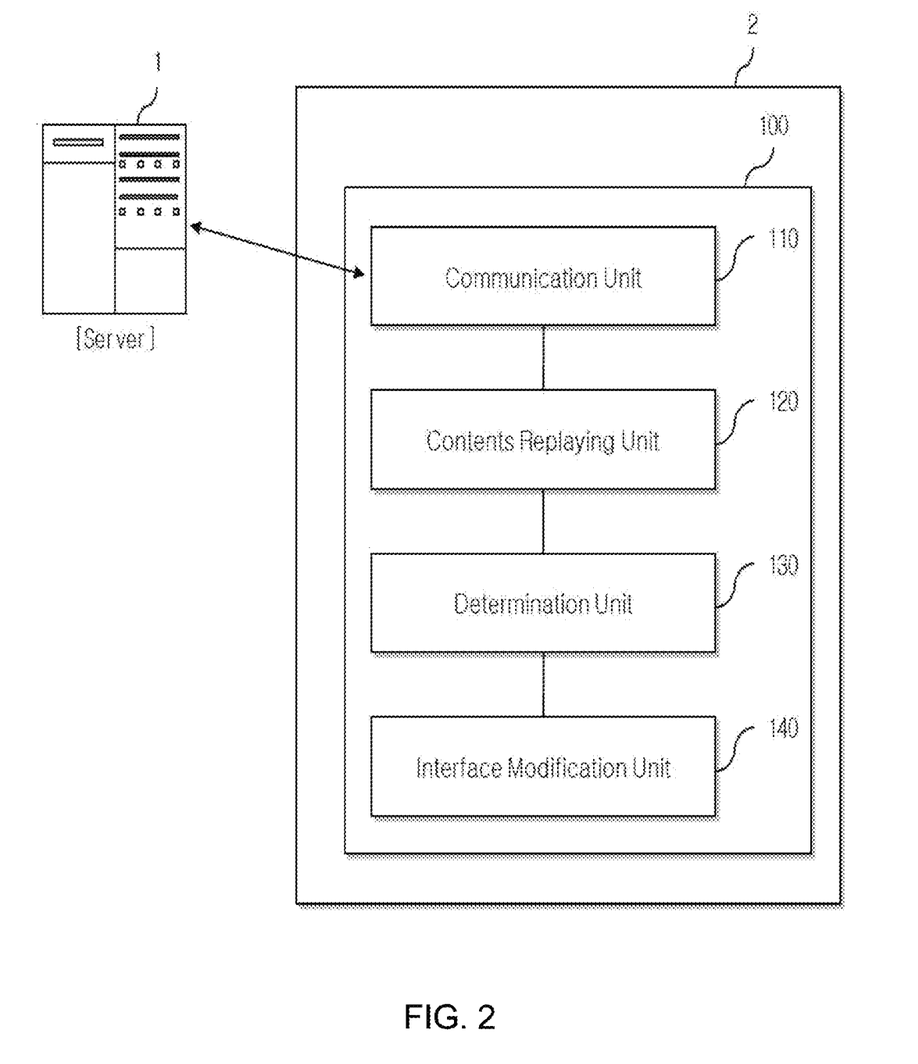
FIG. 2 is a view illustrating an apparatus of modifying a user interface based on network conditions according to an embodiment of the present invention.
Figure 3A:
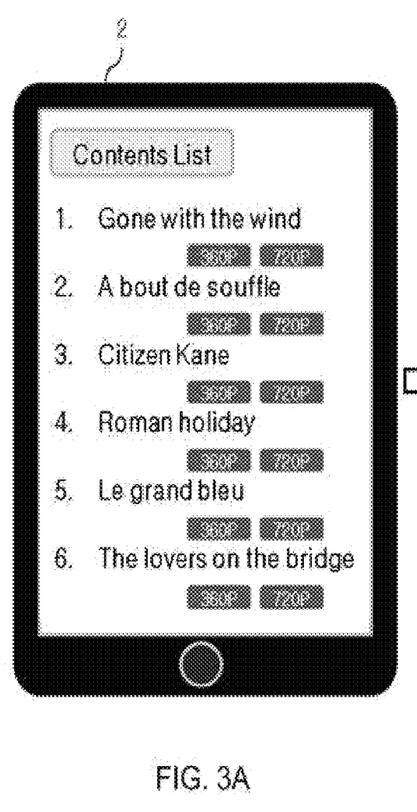
FIGS. 3A and 3B are views illustrating modification of a user interface displayed on a client screen based on network conditions.
Figure 3B:
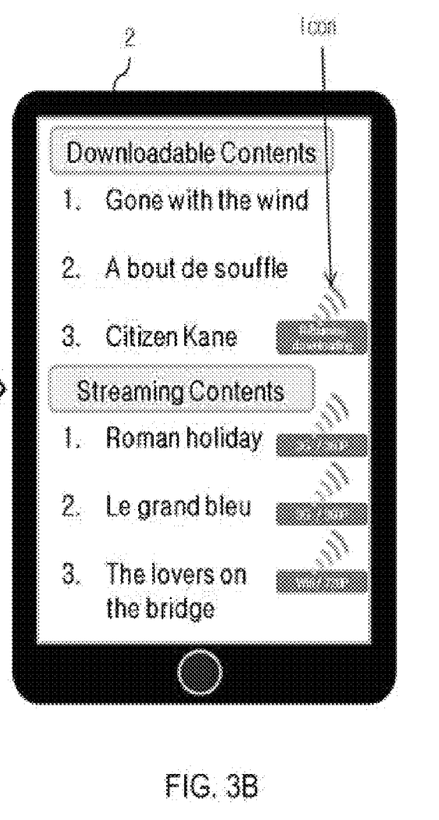

FIG. 1 is a view of a network illustrating a connection relation between a server providing contents and a client receiving contents from the server and replaying the contents according to an embodiment of the present invention. FIG. 2 is a view illustrating an apparatus of modifying a user interface based on network conditions according to an embodiment of the present invention. FIG. 3 is a view illustrating a modification of a user interface displayed on a client screen based on network conditions.

As shown in FIG. 1, a server 1 provides contents to a client 2 connected via a network by a downloading or streaming method. In this case, the contents provided from the server 1 may be in various forms such as videos, e-books, etc.

Particularly, contents such as e-books may not only include typical types of contents such as videos or images that can be received by the downloading or streaming method, but also may include a service or a learning tool that can be received in real-time from the server 1. In this case, the service or the learning tool may be provided in real-time by a streaming method by a desired portion of contents in accordance with the network conditions.

Thus, the term 'streaming' in the present disclosure refers to a method of receiving data from the server 1 in real-time, not a method of downloading, saving, and then opening data, and will not be limited to a transmission method for the real-time replay of a video or a sound.

On the other hand, the client 2 connects to the server 1 by a wired/wireless communication method from a remote location, and downloads contents from the server 1 or receives contents from by the streaming method to replay the contents.

The client 2 may connect to the server 1 via a network and replay contents received by the downloading or streaming method. As long as satisfying the above condition, the client 2 may be various types of hardware such as personal computers, smart phones, tablets, laptops, and netbooks.

As shown in FIG. 2, the user interface modification device 100 based on the network condition is implemented in the client 2.

On the other hand, the user interface modification device 100 based on the network condition includes a communication unit 110, a contents replaying unit 120, a determination unit 130 and an interface modification unit 140.

The communication unit 110 is a unit for communicating with the server 1 through a network, and communicates with the server 1 by, preferably, two or more wired/wireless communication methods. For example, simultaneous support of 3G and WiFi or simultaneous support of wired LAN and Wibro is desirable.

Meanwhile, the contents replaying unit 120 replays the contents selected by a user from the user interface screen for selecting contents.

FIG. 3A shows the list of contents that are stored in the client 2 or are received from the server 1 to be replayed.

Meanwhile, in a typical process in which a variety of contents are provided from the server 1, as shown in FIG. 3A, contents provided from the server 1 are displayed on the screen of the client 2 in a form of list. Here, only links of the contents are displayed regardless of the condition of client 2 or network from the viewpoint of the server 1.

FIG. 3A illustrates a typical user interface screen.

As shown in FIG. 3A, the interface modification unit 140 modifies and displays the user interface screen as described by FIG. 3A, in consideration of the network connection state or a bandwidth necessary for the reception of contents, or whether or not the contents are downloaded, from the viewpoint of the client 2.

Specifically, the interface modification unit 140 modifies the user interface screen according to the necessity of network connection regarding the contents displayed on the corresponding user interface screen. The user interface screen to be displayed as shown in FIG. 3A is actually displayed as shown in FIG. 3B by the interface modification unit 140.

Meanwhile, the determination unit 130 determines whether or not network connection with the server 1 is necessary to replay the contents regarding the contents displayed on the user interface screen for selecting contents as described in FIG. 3A, and the interface modification unit 140 modifies the user interface screen using the above determination result.

Only links are simply shown in FIG. 3 without consideration of the contents itself or the condition of client 2. However, as shown in FIG. 3B, since the contents of which downloading is completed does not require network connection, there is no separate indication thereof. However, for the contents of which downloading is stopped during its progress, there is an icon indicating that network connect with the server 1 is needed, and the icon reads "resume downloading".

In FIG. 3A, there is no indication about available wired/wireless communication units for the connection with the server 1. However, in FIG. 3B, there is an indication about an optimal communication unit among the available wired/wireless communication units.

A typical smart phone indicates whether it is connected through 3G or WiFi on the top of its screen. In the embodiment of the present invention, as described in FIG. 3B, the optimal communication unit is indicated in consideration of the characteristics per content.

Particularly, in FIG. 3A, all the links for each resolution of the contents provided from the server by the streaming method are shown. However, in FIG. 3B, icons indicating network connection with the server 1 is necessary to replay the contents by the streaming method are shown. In this case, it is determined which communication unit is optimal for the contents to be received by the streaming method and the contents of which resolution can be replayed without interruption when connecting with the server 1 through the communication unit. Also, the determination result is shown together.

As shown in FIG. 3B, the icons indicating that network connection is necessary are shown and texts "3G/360p" are marked thereunder. Accordingly, it can be seen that the most optimal communication unit among the currently available wired/wireless communication units regarding the corresponding contents is a 3G network and that the maximum resolution of the contents replayable without interruption when connecting to the 3G network is 360p among different resolution versions.

Even when a user simply selects the contents from the screen of FIG. 3B, all processes of connecting to the server 1, receiving data by the streaming or download method, and replaying data are automatically performed.

In the above example, when a user selects contents from the screen of FIG. 3B, the communication unit 110 automatically connects to the server 1 using the 3G network (i.e. the communication unit 110 does not use other communication units, but uses the most optimal communication unit as indicated in FIG. 3B to connect to the server 1) to receive the contents. In this case, the contents with the optimal resolution as shown in FIG. 3B are automatically received among different links provided from the server 1, and the contents replaying unit 120 replays the contents.

A user can be provided with an uninterrupted and optimal service by simply selecting contents regardless of the type of network connection unit and resolution.

While FIG. 3B shows an example in which the user interface screen is modified, the modification of user interface screen by interface modification unit 140 is not limited to the example.

For example, as shown in FIG. 3B, there is no icon indicating the contents of which downloading is completed, but if necessary, the completion of downloading can be indicated. In order words, a user may know in advance that the client 2 will not connect to the server 1 through the network even when he/she selects the corresponding contents.

On the other hand, the example in FIG. 3B assumes that the network is disconnected. In this case, when the network is already connected, the icon indicating the necessity of network connection may not be displayed. However, when the sensitivity of currently connected network is low or the bandwidth is no sufficient (e.g., when the wireless LAN reception sensitivity is very low), re-connection with other communication units may be needed. In such case, an icon indicating the necessity of network connection may be displayed.

This also corresponds to the result of modification by interface modification unit 140.

As described above, the modification of user interface by interface modification unit 140 includes modifying the user interface in real-time or at a certain interval in consideration of whether or not the network is connected and the connection state.

Meanwhile, when the server 1 provides streaming links having two or more different resolutions for the same contents, it has been explained that the interface modification unit 140 modifies the user interface by determining an uninterruptedly replayable resolution when connecting to the current server 1, or by determining an optimal wired/wireless communication method and then determining an uninterruptedly replayable resolution based on the determined optical communication method.

For this, the interface modification unit 140 can perform the following processes. First, when there is a separate communication interface such as when communication with the server 1 is performed using a dedicated software installed in the client 2, the interface modification unit 140 may inquire about whether or not streaming links having two or more different resolutions for the same contents are provided from the server 1, or may inquire about a network connection bandwidth necessary to replay the contents of each streaming link by resolution.

For example, the server 1 provides streaming links having two different resolutions according to the data transfer rate to the client 2; one of the streaming links provides 360p resolution and the other provides 720p. Also, when considering the compression rate of the corresponding video, in order to uninterruptedly replay the 360p and 720p contents, the transfer rate must be at least 1024 bps/s and 4096 bps/s, respectively. Under the above assumption, as the interface modification unit 140 requests for corresponding information from the server 1, the server 1 provides streaming links having two different resolutions for the same contents and provides what the minimum transfer rate is for each streaming link to the interface modification unit 140.

Thus, when the network connection with the current server 1 is necessary, the interface modification unit 140 selects one having the highest resolution from streaming links having a transfer rate greater than a required minimum transfer rate in consideration of a current transfer rate of the network connection with the server 1 and a transfer rate expected by an optimal wired/wireless communication unit when the connection is necessary.

Meanwhile, when the server 1 provides the contents links on the web, the client 2 analyzes the corresponding webpage. In this case, it is determined whether or not there are two or more links for the same video by analyzing tags, and is determined keywords (e.g., 360p or 720p) that explain each link by analyzing texts.

Thus, as two or more streaming links exist and the resolutions of each link are verified, the interface modification unit 140 determines the minimum data transfer rate needed for the contents of the corresponding resolution to be uninterruptedly replayed. In this case, predetermined values for each resolution may be used.

Thereafter, in consideration of the data transfer rate of network connection with server 1 or the transfer rate expected by the optimal wired/wireless communication unit when the connection is necessary, one having the highest resolution from streaming links having a transfer rate greater than a required minimum transfer rate is selected.

As described above, the modification of the user interface by interface modification unit 140 may includes displaying that the network connection is necessary on the screen or displaying whether or not the network connection is necessary for each content, which communication method is optimal, and what is the maximum resolution in which the contents can be uninterruptedly replayed.

In addition, as described in FIG. 3B, the interface modification unit 140 may arrange and display a plurality of contents based on certain standards when displaying the plurality of contents in a form of list.

For example, the interface modification unit 140 may arrange and display the contents by dividing the contents into contents that no longer require network connection with the server 1 and contents that require separate connection to the server 1 for replay.

The interface modification unit 140 may arrange contents of which downloads are completed on top of the list such that the contents can be displayed first, and may display contents that require network connection thereafter such that the contents can be displayed later.

This allows a user to preferentially view the contents that can be immediately replayed without communicating with the server 1 prior to the contents of which connection with server 1 takes time or incurs communication expenses.

Meanwhile, the above explanation is assuming the connection with server 1 is disconnected. When the connection with server 1 continues and sufficient communication speed is provided, the interface modification unit 140 may not distinguish between the downloaded contents and the contents that can be provided by the streaming method.

Hereinafter, a user interface modification method based on the network condition will be described in detail with reference to FIGS. 4 and 5.

Figure 4:
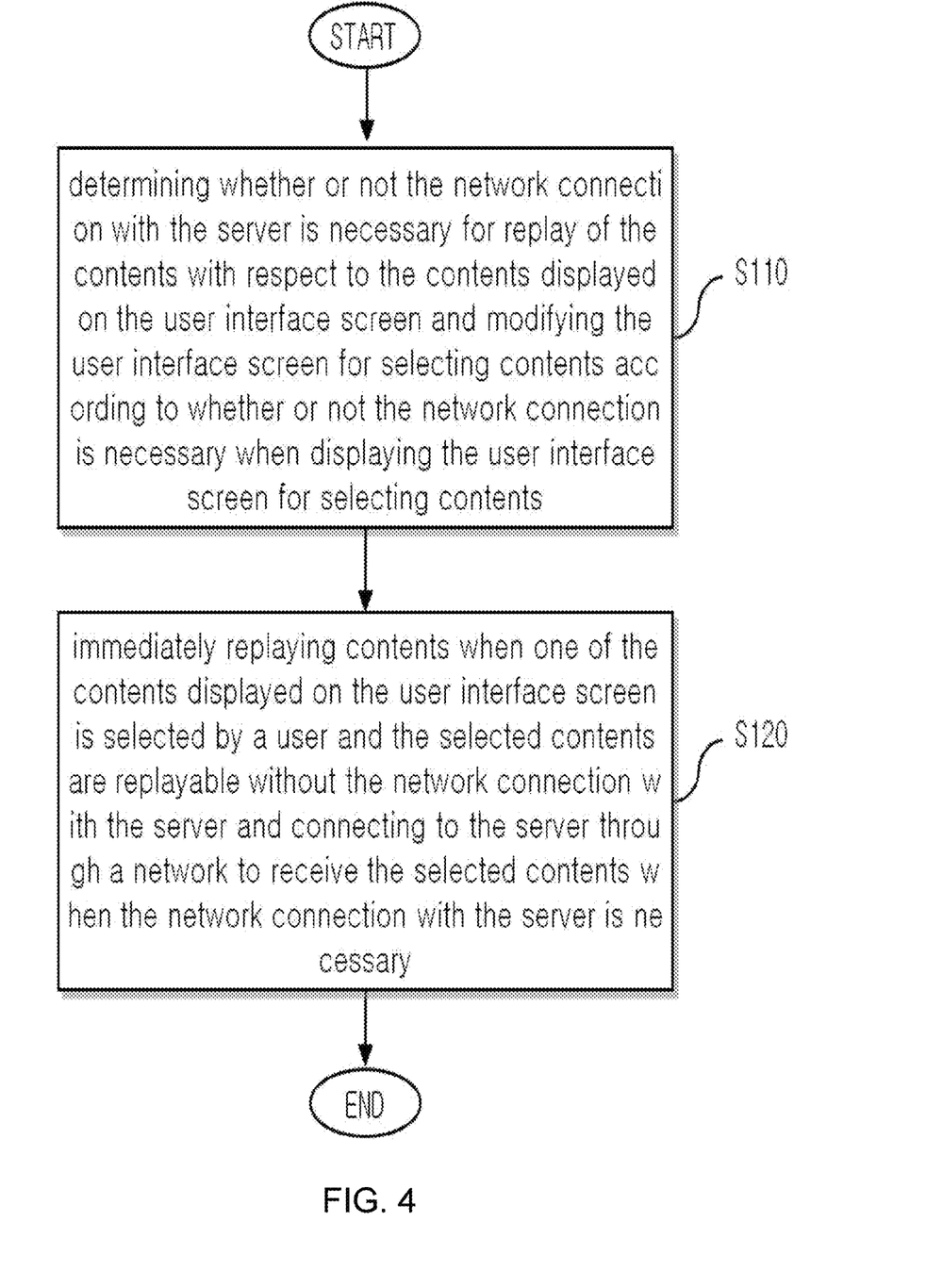
FIG. 4 is a flowchart illustrating a user interface modification method based on network conditions described in time-series according to an embodiment of the present invention.

FIG. 4 is a flowchart illustrating a user interface modification method based on network conditions described in time-series according to an embodiment of the present invention. FIG. 5 is a flowchart illustrating a process of modifying a user interface in the method of FIG. 4.

As shown in FIG. 4, the client 2 displays a user interface screen for selecting contents, and modifies the user interface screen for selecting contents by determining whether or not the network connection with the server is necessary to replay the contents (S110).

As shown in FIG. 3B, in case of contents that require the network connection with server 1, modification of user interface may be performed by a method of displaying the icon indicating network connection is necessary at one side of the contents on the user interface screen.

A user may download contents or may receive contents in real-time by the streaming method. In case of downloading, downloading may be normally completed, but sometimes the connection may be disconnected during the downloading depending on the condition of the network.

In such case, when the user interface screen for the selection of contents is displayed, the contents may be divided into contents of which downloading is completed and contents of which downloading was stopped because the network was disconnected during the downloading. When the contents of which downloading is stopped during the downloading, an icon indicating that the network connection with the server is necessary to resume the downloading of the contents may be displayed at one side of the contents on the user interface screen for selecting the contents.

As shown in FIG. 3B, a text "resume downloading" may be placed below the icon.

Meanwhile, a user may receive the contents by the streaming method, and in such case, an icon indicating network connection is necessary may be provided to receive and replay the contents by the streaming method.

As shown in FIG. 3B, it can be seen that "streaming" is described under an icon.

When the user interface screen is modified as such, a user may select one of the contents displayed on the user interface screen.

In this case, when the corresponding contents are replayable without a network connection to the server, the client 2 immediately replays the content. When the contents require network connecting with the server 1, the client 2 connects to the server 1 through the network, and then receives and replays the corresponding contents (S120).

When it is necessary to resume the downloading, a downloaded portion is replayed while the remaining portion is being downloaded. In case of streaming method, the contents received by the streaming method can be replayed in a real-time.

Meanwhile, the server 1 may provide two or more streaming links for the same contents divided by the data transfer rate to the client 2 when providing the contents by the streaming method.

In this case, the client 2 selects the optimal communication unit for connecting to the server 1, and then selects an uninterruptedly replayable streaming link with the best quality (e.g., image quality) from two or more streaming links provided by the server 1.

Figure 5:
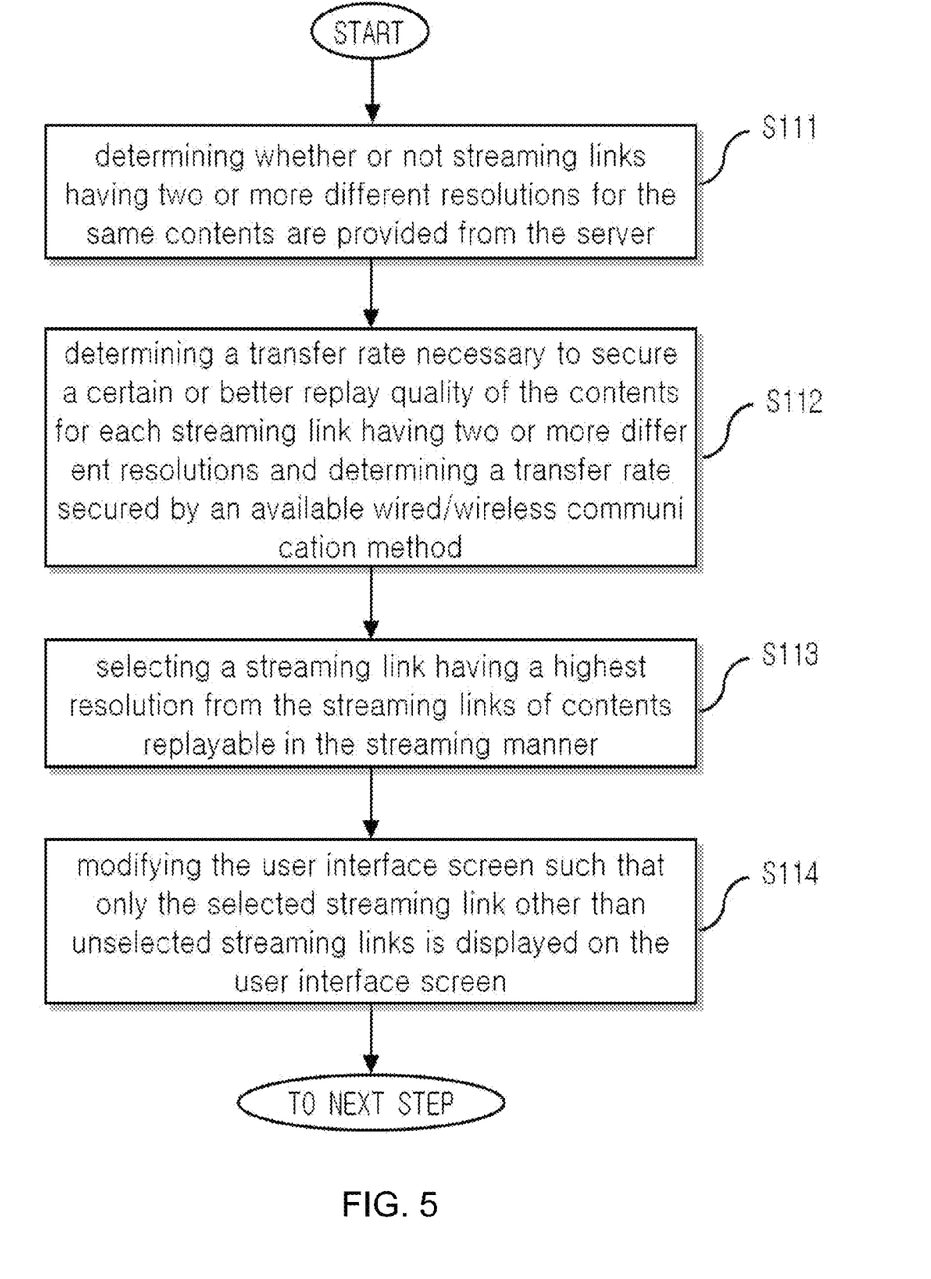
FIG. 5 is a flowchart illustrating a process of modifying a user interface in the method of FIG. 4.

To explain the above process with reference to FIG. 5, firstly, the client 2 determines whether or not the streaming links having two or more different resolutions for the same contents are provided from the server when displaying an icon that indicates network connection is necessary at one side of the contents on the user interface screen (S111).

Meanwhile, a minimum transfer rate necessary for replay of contents is determined for each streaming link having two or more different resolutions, and a data transfer rate secured by an available wired/wireless communication unit is determined (S112).

In this case, in order to determine the minimum data transfer rate required for each streaming link, the client 2 may inquire about whether or not streaming links having two or more different resolutions for the same contents are provided from the server 1 or about the minimum required data transfer rate necessary to replay the contents of each streaming link by resolution.

Alternatively, the client 2 may determine whether or streaming links having two or more different resolutions for the same contents are provided from the server 1, or may determine the minimum required data transfer rate for a smooth and uninterrupted replay of each streaming link by resolution by receiving a webpage including streaming links of contents from the server 1 and analyzing texts and tags included in the webpage.

Next, a streaming link with the best quality is selected from the streaming links of the contents that can be replayed by the streaming method (S113). When the contents are a video, the streaming link with the highest resolution is selected.

The user interface screen is modified such that only the finally selected streaming link is displayed on the user interface screen (S114).

The unnecessary information that a user do not need to know is removed from the screen by removing the streaming unselected links from the screen.

According to an embodiment of the present invention, a user need not consider whether the connection state of a network ensures a bandwidth enough to receive contents or whether contents are already downloaded or are necessary to additionally download. Thus, even users who are unfamiliar with communication or hardware technologies and the use of equipment can conveniently receive and use contents through a network.

The present invention can be applied to a contents replay technological field that receives and display contents via a network.

Meanwhile, the user interface modification method based on network conditions according to the embodiment of the present invention can also be embodied as computer readable codes on a computer readable recording medium.

In this case, the computer readable recording medium is any data storage device that can store data which can be thereafter read by a computer system. Examples of the computer readable recording medium include DVD-read only memories (DVD-ROMs), random access memories (RAMs), CD-ROMs, hard disks, USB memories, flash memories, magnetic tapes, floppy disks, optical data storage devices, and carrier waves (such as data transmission through the Internet).

The expression, 'stored in a recording media' does not compass only a case where contents are stored in recording media in mass quantity and distributed in a form of package, but also a case where contents are stored in recording media through a network in a form of data packet.

Although the term 'server' is used in this disclosure, the functions or loads are generally distributed and processed in a plurality of servers under a distributed computing environment. Thus, 'server' does not designate a single hardware component but may include a group of servers that are functionally categorized.

Although the term 'network' is used in this disclosure, the term should be construed as a broad concept compassing well-known wired/wireless communication methods such as Local Area Network (LAN) and Wide Area Network (WAN) depending on the distance and size, intranet and Virtual Private Network (VPN) depending on the characteristics of the connection route, and Wibro and WiFi depending on the connection method.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for providing contents to a user, comprising:
   a user interface screen;
   a communication unit for communicating with a server through one or more wired/wireless communication methods;
   a content replaying unit for providing a list of contents on the user interface screen and replaying contents selected by the user;
   a determination unit for determining, for each content in the list, whether or not a new type of network connection to the server is required for a seamless replaying of the each content when condition of a current network connection to the server changes;
   an interface modification unit for modifying the user interface screen,
   wherein, when the determination unit determines that a particular content in the list requires a new type of network connection for replaying the particular content without interruption in a streaming manner, the interface modification unit displays an icon at one side of the particular content in the list on the user interface screen, the icon including texts for an optimal communication method and a maximum resolution of the particular content replayable without interruption, and
   wherein, when the determination unit determines that the current network connection is able to communicate data of the particular content in the list in a streaming manner so that an other network connection is not necessary for replaying the particular content without interruption, the interface modification unit does not display an icon corresponding to the particular content on any screen.

2. The apparatus of claim 1, wherein when the interface modification unit displays the icon, which indicates that the new type of network connection is necessary, the interface modification unit selects an optimal communication method from available wired/wireless communication methods to be provided with a corresponding content in a downloading or streaming manner.

3. The apparatus of claim 1, wherein when the interface modification unit displays the icon, which indicates that the new type of network connection is necessary, the interface modification unit selects a stream link having a highest resolution from streaming links of replayable contents and displays only the selected streaming link on the user interface screen by determining a transfer rate necessary to secure a certain or better replay quality of the contents and determining a transfer rate secured by an available wired/wireless communication method when the streaming links having two or more different resolutions for the same contents are provided from the server.

4. The apparatus of claim 3, wherein the interface modification unit inquires about whether or not the streaming links having two or more resolutions for the same contents are provided from the server or the transfer rate necessary to secure the certain or better replay quality of the contents for each streaming link.

5. The apparatus of claim 3, wherein the interface modification unit is provided with a webpage comprising the streaming links of the contents from the server and then analyzes a text and a tag comprised in the webpage to determine whether or not the streaming links having two or more resolutions for the same contents are provided from the server or the transfer rate necessary to secure the certain or better replay quality of the contents for each streaming link.

6. The apparatus of claim 1, wherein when the interface modification unit displays the contents displayed on the user interface screen for selecting the contents, the interface modification unit displays the contents, which are already downloaded and stored or provided from the server in a downloading or streaming manner, in a form of list, and arrange contents that do not need the network connection because the contents are already downloaded in a list and contents that need the network connection in another list.

7. A method for providing contents to a user of an apparatus having a user interface screen, comprising:
   displaying a list of contents on the user interface screen;
   determining, for each content in the list, whether or not a new type of network connection to a server is necessary for replay of the each content in the list when condition of a current network connection between the server and the apparatus changes;

when it is determined that the current network connection for a particular content in the list is not able to communicate data of the particular content in a streaming manner at a speed sufficient for replaying the particular content without interruption, displaying, for the particular content in the list, an icon at one side of the particular content in the list on the user interface screen, the icon including texts for an optimal communication method and a maximum resolution of the particular content replayable without interruption;

when it is determined that the current network connection for the particular content is able to communicate data of the particular content in a streaming manner at a speed sufficient for replaying the particular content without interruption so that an other network connection is not necessary, do not displaying an icon corresponding to the particular content on any screen;

replaying a specific content displayed on the user interface screen when the specific content is selected by the user and the specific content is replayable without a network connection to the server.

8. The method of claim 7, wherein the step of determining whether or not the new type of network connection is necessary comprises selecting optimal one from available wired/wireless communication methods to receive the contents in a downloading or streaming method and displaying an icon indicating the selected communication method.

9. The method of claim 7, wherein the step of determining whether or not the new type of network connection is necessary comprises: determining whether or not streaming links having two or more different resolutions for the same contents are provided from the server; determining a transfer rate necessary to secure a certain or better replay quality of the contents for each streaming link having two or more different resolutions and determining a transfer rate secured by an available wired/wireless communication method; selecting a streaming link having a highest resolution from the streaming links of contents replayable in the streaming manner; and modifying the user interface screen such that only the selected streaming link other than unselected streaming links is displayed on the user interface screen.

10. The method of claim 9, wherein the step of determining the transfer rate comprises inquiring about whether or not the streaming links having the two or more different resolutions for the same contents are provided from the server or the transfer rate necessary to secure the certain or better replay quality of the contents for each streaming link having the two or more different resolutions.

11. The method of claim 9, wherein the step of determining the transfer rate comprises inquiring about whether or not the streaming links having the two or more different resolutions for the same contents are provided from the server or the transfer rate necessary to secure the certain or better replay quality of the contents for each streaming link having the two or more different resolutions by receiving a webpage comprising the streaming links of the contents from the server and analyzing a text and a tag comprised in the webpage.

12. The apparatus of claim 1, wherein the interface modification unit sorts the contents on the user interface screen in view of the current network connection to divide the contents into a first group of which downloading is completed and a second group of which downloading is stopped.

* * * * *